United States Patent
Ochiai et al.

(10) Patent No.: US 8,701,530 B2
(45) Date of Patent: Apr. 22, 2014

(54) METHOD OF CUTTING THIN-WALLED MATERIAL

(75) Inventors: Hiroyuki Ochiai, Tokyo (JP); Masaharu Yano, Tokyo (JP); Kiyoshi Fujikake, Tokyo (JP); Yoshio Takimoto, Tokyo (JP); Yutaka Watanabe, Tokyo (JP)

(73) Assignee: IHI Corporation, Tokyo (JP)

( * ) Notice: Subject to any disclaimer, the term of this patent is extended or adjusted under 35 U.S.C. 154(b) by 438 days.

(21) Appl. No.: 13/055,932

(22) PCT Filed: Jul. 16, 2009

(86) PCT No.: PCT/JP2009/062912
§ 371 (c)(1),
(2), (4) Date: Jan. 25, 2011

(87) PCT Pub. No.: WO2010/010845
PCT Pub. Date: Jan. 28, 2010

(65) Prior Publication Data
US 2011/0120278 A1    May 26, 2011

(30) Foreign Application Priority Data

Jul. 25, 2008  (JP) .................................. 2008-192646
Feb. 4, 2009  (JP) .................................. 2009-023291

(51) Int. Cl.
*B23B 1/00* (2006.01)

(52) U.S. Cl.
USPC .......................................................... 82/1.11

(58) Field of Classification Search
USPC ......... 82/1.11, 113, 121, 129; 407/67, 70, 71; 279/137
See application file for complete search history.

(56) References Cited

U.S. PATENT DOCUMENTS 6,565,497 B1 *   5/2003   Yamazaki et al. ............... 483/11
7,043,332 B1 *   5/2006   Fujinawa et al. ............. 700/186

FOREIGN PATENT DOCUMENTS

| EP | 15300 A | * | 9/1980 |
| EP | 92634 A1 | * | 11/1983 |
| GB | 2195280 A | * | 4/1988 |
| JP | 59-54569 | | 4/1984 |
| JP | 62-218042 A | | 9/1987 |

(Continued)

OTHER PUBLICATIONS

Oyo Kikai Kogaku Henshubu, 'Senban Manual', The Publishing Taiga Shuppan Co., Ltd., May 20, 1974, p. 218, right col., line 10 to p. 219, left col., line 9.

(Continued)

*Primary Examiner* — Daniel Howell
*Assistant Examiner* — Nicole N Ramos
(74) *Attorney, Agent, or Firm* — Griffin & Szipl, P.C.

(57) ABSTRACT

A method is provided to cut a thin-walled member without causing chattering vibration, without using a chattering vibration preventing retainer, that performs the following: (A) preparing a material having much stock for obtaining a thin-walled material, (B) while rotating the material about a center axis, cutting the inner round surface of the material within a predetermined range by feeding a cutting tool relative to material by the desired distance from one end side to the other end side of the material along the center axis, (C) while rotating the material about the center axis, cutting the outer round surface of the material within a predetermined range by feeding the cutting tool relative to the material by the desired distance from the one end side to the other end side of the material along the center axis, and (D) alternately repeating (B) and (C) to finish cutting the material.

11 Claims, 11 Drawing Sheets

(56) References Cited

FOREIGN PATENT DOCUMENTS

| JP | 5-111806 A | | 5/1993 |
|----|---|---|---|
| JP | 6254705 A | | 9/1994 |
| JP | 09-131610 A | | 5/1997 |
| JP | 10249605 A | * | 9/1998 |
| JP | 3057952 B2 | | 7/2000 |
| JP | 2003103402 A | | 4/2003 |
| JP | 2008-36751 A | | 2/2008 |

OTHER PUBLICATIONS

International Search Report, issued in corresponding International Application No. PCT/JP2009/062912, completed Sep. 1, 2009, mailed Sep. 15, 2009.

Office Action issued on Jun. 15, 2012 in corresponding Chinese application 2009801302881.

Office Action issued Jun. 13, 2012 in related Japanese application 2010-521689 (no translation available).

Office Action issued Oct. 3, 2012 in related Japanese application 2010-521689 (no translation available).

Office Action issued Feb. 1, 2013 in related Japanese application 2010-521689 (no translation available).

"Lathe manual," Applied Mechanical Engineering Editorial Department, published by Sabura Misawa, Taiga Publishing Co., Ltd., May 20, 1974.

* cited by examiner

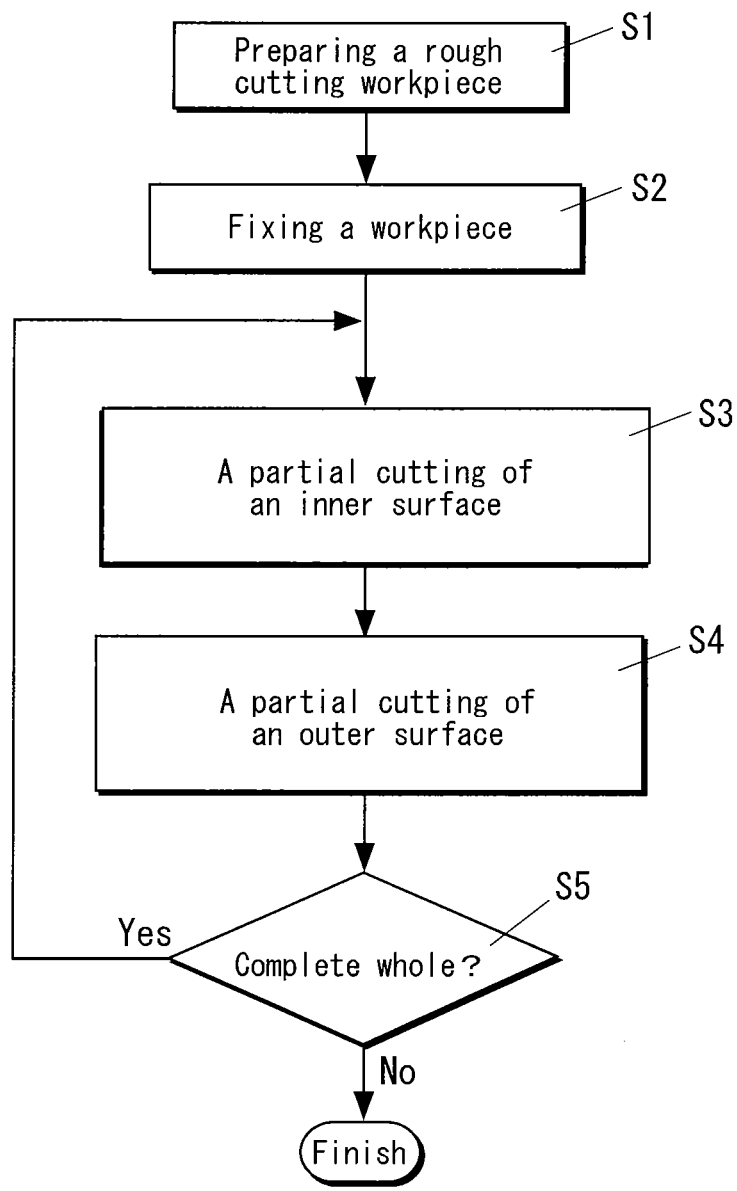

FIG. 11A
FIG. 11B
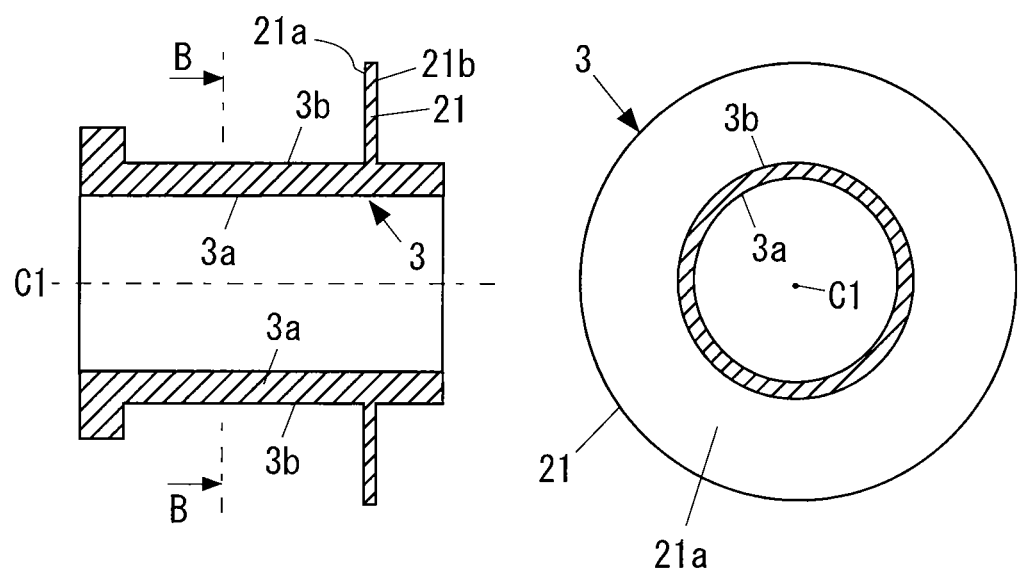
FIG. 12
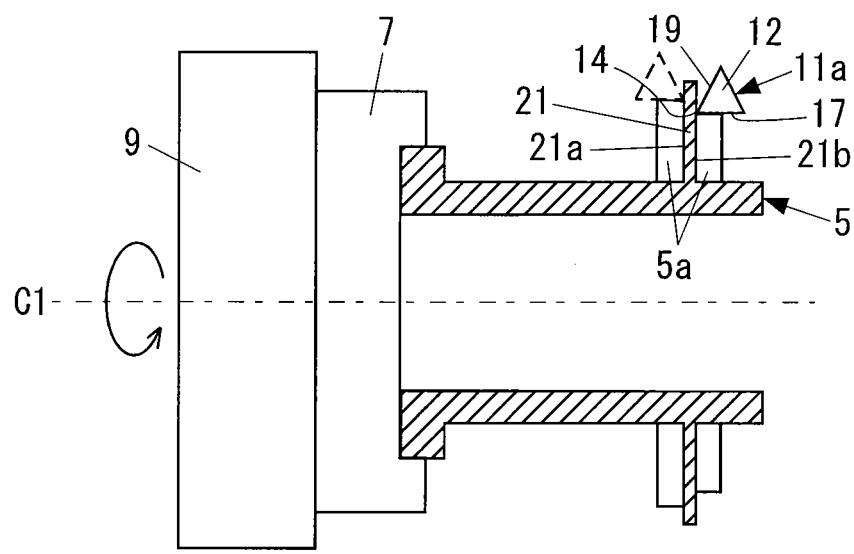

METHOD OF CUTTING THIN-WALLED MATERIAL

This is a National Phase Application in the United States of International Patent Application No. PCT/JP2009/062912 filed Jul. 16, 2009, which claims priority on Japanese Patent Application No. 2008-192646, filed Jul. 25, 2008, and on Japanese Patent Application No. 2009-023291, filed Feb. 4, 2009. The entire disclosures of the above patent applications are hereby incorporated by reference.

BACKGROUND OF THE INVENTION

1. Technical Field of the Invention

The present invention relates to a method of cutting a thin-walled material.

2. Description of the Related Art

In this application, a thin-walled material is, for example, a rotating body which rotates around a central axis, and means a material having a portion which is thin in thickness. The thin-walled material is, for example, a ring or a casing of an aircraft jet engine, which is made of Ti alloy, Ni alloy, or Al alloy. Also, the thin-walled material may also be a part having as a portion thereof a thin-walled portion which is a cutting target of the present invention.

At a rotating machine such as a jet engine, a gas turbine, or a supercharger, a rotating body such as a rotating shaft which rotates around a central axis is provided.

There is a case where the rotating body has an inner round surface and an outer round surface over a predetermined range in the direction parallel to the central axis. In this case, the rotating body is manufactured as follows. Rough cutting work of the inner round surface, rough cutting work of the outer round surface, semi-finish cutting work of the inner round surface, semi-finish cutting work of the outer round surface, finish cutting work of the inner round surface, and finish cutting work of the outer round surface are performed with respect to a material in this order.

In addition, as prior art documents of the present invention, Patent Documents 1 to 3 described below are given.

Patent Document 1: Japanese Patent Application Laid-Open No. 2008-036751

Patent Document 2: Japanese Patent Application Laid-Open No. 2003-103402

Patent Document 3: Japanese Patent No. 3057952

However, in the finish cutting work, since the wall thickness between the inner round surface and the outer round surface is made thin, chattering vibration or deformation easily occurs. Therefore, a chattering vibration preventing retainer is needed. That is, the finish cutting work of the inner round surface is performed in a state where the outer round surface is mounted on the chattering vibration preventing retainer, and thereafter, the finish cutting work of the outer round surface is performed in a state where the inner round surface is mounted on the chattering vibration preventing retainer.

SUMMARY OF THE INVENTION

Therefore, a main object of the present invention is to allow cutting of a thin-walled material to be performed without using a chattering vibration preventing retainer and without causing chattering vibration.

In order to achieve the above-mentioned object, according to a first invention, there is provided a method of cutting a thin-walled material having an inner round surface and an outer round surface over a predetermined range in the direction parallel to a central axis thereof, the method including the steps of:

(A) preparing a material having a much stock for obtaining the thin-walled material;

(B) cutting the inner round surface by a desired distance within the predetermined range by feeding a cutting tool relative to the material by the desired distance from one end side to the other end side of the central axis while rotating the material around the central axis;

(C) cutting the outer round surface by a desired distance within the predetermined range by feeding the cutting tool relative to the material by the desired distance from one end side to the other end side of the central axis while rotating the material around the central axis; and (D) finishing the inner round surface and the outer round surface over the predetermined ranges by alternately repeating the steps (B) and (C), wherein the step (D) is performed in order of the step (B) and the step (C) or in order of the step (C) and the step (B), after the step (A).

In the cutting method according to the present invention described above, since the steps (B) and (C) are alternately repeated in such a manner that in the step (B), the inner round surface is cut by a desired distance within the predetermined range by feeding the cutting tool relative to the material by the desired distance from one end side to the other end side of the central axis while rotating the material around the central axis and in the step (C), the outer round surface is cut by a desired distance within the predetermined range by feeding the cutting tool relative to the material by the desired distance from one end side to the other end side of the central axis while rotating the material around the central axis, a cutting force can be supported by the remaining much stock (cutting margin). That is, the cutting force when performing the step (B) is supported by the much stock remaining on the outer circumstance side, and the cutting force when performing the step (C) is supported by the much stock remaining on the inner circumstance side. In this way, it is possible to perform cutting of the thin-walled material without using a chattering vibration preventing retainer and without causing chattering vibration.

According to the preferred embodiment of the first invention, the thin-walled material is a rotating body. Accordingly, it is possible to fabricate a well-balanced rotating body.

According to the preferred embodiment of the first invention, in the step (B), the cutting tool is fed from one end side to the other end side of the central axis up to a position entered in the direction parallel to the central axis by a distance within the desired distance into an uncut region of the outer round surface side, and in the step (C), the cutting tool is fed from one end side to the other end side of the central axis up to a position entered in the direction parallel to the central axis by a distance within the desired distance into an uncut region of the inner round surface side.

In this manner, since in the step (B) or (C), the cutting tool is fed to a position entered in the direction parallel to the central axis by a distance within the desired distance into an uncut region where the much stock still remains on the side opposite to a cutting surface, even in a case where the wall thickness between the inner round surface and the outer round surface is thin, it is possible to increase the distance in which the cutting tool can be fed such that chattering vibration does not occur.

According to the preferred embodiment of the first invention, the step (B) is performed while fitting a cutting position by the cutting tool in the radial direction of the thin-walled material to a position of the inner round surface, and the step (C) is performed while fitting a cutting position by the cutting tool in the radial direction of the thin-walled material to a position of the outer round surface.

For example, in a case where a radial location of the inner round surface or the outer round surface is constant over a cutting range of the step (B) or (C), the cutting position in the radial direction is maintained to be constant.

On the other hand, in a case where a radial location of the inner round surface or the outer round surface varies according to an axial location in a cutting range of the step (B) or (C), the cutting position in the radial direction is changed according to a feed amount of the cutting tool in the direction parallel to the central axis. In this way, a ring (a thin-walled material), in which an inner round surface or an outer round surface is tapered, can also be fabricated.

Also, in order to achieve the above-mentioned object, according to a second invention, there is provided a method of cutting a thin-walled material having at least one of an outer round surface and an inner round surface with respect to a central axis, and also having a flange which extends outward or inward in a radial direction from the outer round surface or the inner round surface, wherein the flange has a first side surface, which faces one side in the direction parallel to the central axis, and a second side surface, which faces the other side in the direction parallel to the central axis, over a predetermined range in the radial direction, the method including the steps of:

(A) preparing a material having a much stock for obtaining the flange;

(B) cutting the first side surface by a desired distance within the predetermined range by feeding a cutting tool relative to the material by the desired distance from the outside in the radial direction to the inside in the radial direction or from the inside in the radial direction to the outside in the radial direction while rotating the material around the central axis;

(C) cutting the second side surface by a desired distance within the predetermined range by feeding the cutting tool relative to the material by the desired distance from the outside in the radial direction to the inside in the radial direction or from the inside in the radial direction to the outside in the radial direction while rotating the material around the central axis; and (D) finishing the first side surface and the second side surface over the predetermined ranges of the flange by alternately repeating the steps (B) and (C), wherein the step (D) is performed in order of the step (B) and the step (C) or in order of the step (C) and the step (B), after the step (A).

In the cutting method according to the present invention described above, since the steps (B) and (C) are alternately repeated in such a manner that in the step (B), the first side surface is cut by a desired distance within the predetermined range by feeding a cutting tool relative to the material by the desired distance from the outside in the radial direction to the inside in the radial direction or from the inside in the radial direction to the outside in the radial direction while rotating the material around the central axis and in the step (C), the second side surface is cut by a desired distance within the predetermined range by feeding the cutting tool relative to the material by the desired distance from the outside in the radial direction to the inside in the radial direction or from the inside in the radial direction to the outside in the radial direction while rotating the material around the central axis, a cutting force can be supported by the remaining much stock. That is, the cutting force when performing the step (B) is supported by the much stock remaining on the second side surface side, and the cutting force when performing the step (C) is supported by the much stock remaining on the first side surface side. In this way, it is possible to perform cutting of the thin-walled material without using a chattering vibration preventing retainer and without causing chattering vibration.

According to the preferred embodiment of the second invention, the thin-walled material is a rotating body. Accordingly, it is possible to fabricate a well-balanced rotating body.

The cutting method of the first invention or the second invention may be performed by a first tool direction regulating method.

In the first tool direction regulating method in the first invention or the second invention, a cutting edge of the cutting tool has a feed-side surface, which faces a feed direction side of the cutting tool, and a material-side surface, which faces a cutting surface side of the material 5, and the steps (B) and (C) are performed in a state where a direction of the feed-side surface is set to be a direction slightly inclined from a feed direction of the cutting tool to the cutting surface side.

In addition, the first tool direction regulating method is preferably performed at a normal-line constant region. The normal-line constant region is, in the first invention, a region where a direction of a normal line to the inner round surface or the outer round surface does not vary according to an axial location (a position in a central axis direction) and in the second invention, a region where a direction of a normal line to the first side surface or the second side surface does not vary according to a radial location (a position in a radial direction with respect to a central axis).

Since chips created by cutting fly out in the direction opposite to a direction in which the feed-side surface faces, in the first tool direction regulating method, if the feed-side surface is slightly inclined to the cutting surface side, a direction in which the chips fly out is inclined to the opposite side to the cutting surface side by a corresponding amount. Therefore, collision of the chips with the cutting surface can be prevented, so that deformation of the thin-walled material due to collision of the chips can be prevented. Also, the smoothness of cutting can be maintained by making the inclination of the feed-side surface to the cutting surface side small.

The cutting method of the first invention may also be performed by a second tool direction regulating method.

The second tool direction regulating method in the first invention is preferably carried out when cutting the inner round surface or the outer round surface at a normal-line varying region where a direction of a normal line to the inner round surface or the outer round surface varies according to an axial location.

That is, in the second tool direction regulating method in the first invention, a cutting edge of the cutting tool has a feed-side surface which faces a feed direction side of the cutting tool, and the step (B) or (C) is performed while controlling a direction of the cutting tool such that at the normal-line varying region, the angle that the feed-side surface makes with a cutting surface of the material becomes an angle in the range of 80 degrees or more and 100 degrees or less.

In this way, even in the case of cutting the inner round surface or the outer round surface at the normal-line varying region, the inner round surface or the outer round surface can be cut in one shot without exchanging the cutting tool, unlike the past, as described below.

In the past, in a case where the angle that the feed-side surface of a cutting edge makes with the cutting surface of a material varies according to an axial location, for every cutting area in a central axis direction, the cutting edge which is mounted on the cutting tool has been exchanged into a cutting edge appropriate to the area. Also, in the past, since at each axial location, the feed-side surface of the cutting edge has not made the angle in the range of 80 degrees or more and 100 degrees or less with the cutting surface of the material, a cutting force acting on the material has become larger.

In contrast to this, in the second tool direction regulating method in the first invention, since during cutting of the inner round surface or the outer round surface, a direction of the cutting tool is controlled such that the angle that the feed-side surface makes with the cutting surface of the material becomes the angle in the range of 80 degrees or more and 100 degrees or less, the entire cutting region can be cut by one cutting edge without exchanging the cutting edge for every cutting region in the central axis direction.

Furthermore, in the second tool direction regulating method in the first invention, since during cutting of the inner round surface or the outer round surface, the angle that the feed-side surface makes with the cutting surface of the material can be maintained in the range of 80 degrees or more and 100 degrees or less, a cutting force acting on the material can be suppressed to a lower level. Accordingly, in the step (B) or (C), it is possible to make the cutting depth of the cutting edge into the material deep, whereby the inner round surface or the outer round surface can be cut in one shot without performing semi-cutting (that is, semi-finish lathe-turning).

The cutting method of the second invention may also be performed by the second tool direction regulating method.

The second tool direction regulating method in the second invention is preferably carried out when cutting the first side surface or the second side surface at a normal-line varying region where a direction of a normal line to the first side surface or the second side surface varies according to a radial location.

That is, in the second tool direction regulating method in the second invention, a cutting edge of the cutting tool has a feed-side surface which faces a feed direction side of the cutting tool, and the step (B) or (C) is performed while controlling a direction of the cutting tool such that at the normal-line varying region, the angle that the feed-side surface makes with a cutting surface of the material becomes the angle in the range of 80 degrees or more and 100 degrees or less.

In this way, even in the case of cutting the first side surface or the second side surface at the normal-line varying region, the first side surface or the second side surface can be cut in one shot without exchanging the cutting tool, unlike the past, as described below.

In the past, in a case where the angle that the feed-side surface of a cutting edge makes with the cutting surface of a material varies according to a radial location, for every cutting area in a radial direction, the cutting edge which is mounted on the cutting tool has been exchanged into a cutting edge appropriate to the area. Also, in the past, since at each radial location, the feed-side surface of the cutting edge has not made the angle in the range of 80 degrees or more and 100 degrees or less with the cutting surface of the material, a cutting force acting on the material has become larger.

In contrast to this, in the second tool direction regulating method in the second invention, since during cutting of the first side surface or the second side surface, a direction of the cutting tool is controlled such that the angle that the feed-side surface makes with the cutting surface of the material becomes the angle in the range of 80 degrees or more and 100 degrees or less, the entire cutting region can be cut by one cutting edge without exchanging the cutting edge for every cutting region in the radial direction.

Furthermore, in the second tool direction regulating method in the second invention, since during cutting of the first side surface or the second side surface, the angle that the feed-side surface makes with the cutting surface of the material can be maintained in the range of 80 degrees or more and 100 degrees or less, a cutting force acting on the material can be suppressed to a lower level. Accordingly, in the step (B) or (C), it is possible to make a cutting depth of the cutting edge into the material deep, whereby the first side surface or the second side surface can be cut in one shot without performing semi-cutting.

According to the cutting methods of the present invention described above, it is possible to perform cutting of the thin-walled material without using a chattering vibration preventing retainer and without causing chattering vibration.

BRIEF DESCRIPTION OF THE DRAWINGS

FIG. 5 is a flowchart illustrating the method of cutting a thin-walled material according to the first embodiment of the present invention.

FIG. 11A is a transverse cross-sectional view illustrating a configuration example of a thin-walled material which is fabricated by a cutting method according to a second embodiment of the present invention.

FIG. 11B is a cross-sectional view taken along line B-B of FIG. 11A.

FIG. 12 is an explanatory diagram of the cutting method according to the second embodiment of the present invention.

DESCRIPTION OF THE PREFERRED EMBODIMENT

Figure 1A:
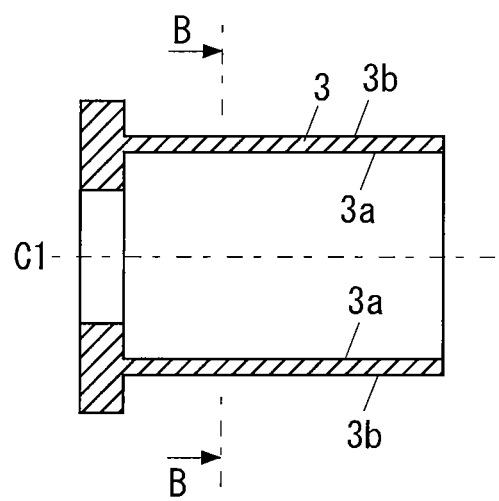
FIG. 1A is a transverse cross-sectional view of a thin-walled material which is fabricated by a cutting method according to a first embodiment of the present invention.

Best embodiments for carrying out the present invention are described based on the drawings. In addition, portions common in the respective drawings are designated with the same reference numerals and duplicate description is omitted.

First Embodiment

Figure 1B:
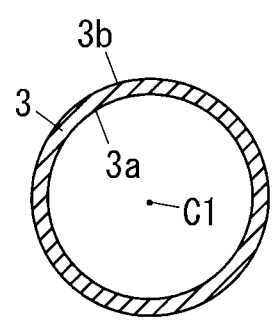
FIG. 1B is a cross-sectional view taken along line B-B of FIG. 1A.

FIG. 1A is a transverse cross-sectional view of a thin-walled material 3 (that is, workpiece) which is fabricated by a cutting method according to a first embodiment of the present invention and FIG. 1B is a cross-sectional view taken along line B-B of FIG. 1A.

In this example, the thin-walled material 3 is a material which is provided at a rotating machine such as a jet engine, a gas turbine, or a supercharger and rotationally driven around a central axis C1 of the rotating machine. For example, the thin-walled material 3 may be the rotating shaft itself of the rotating machine or may also be a material which is mounted on and fixed to the rotating shaft.

As shown in FIGS. 1A and 1B, the thin-walled material 3 has an inner round surface 3a and an outer round surface 3b over a predetermined range in the direction parallel to the central axis C1 thereof. The expression "thin-walled" in the thin-walled material 3 means that the thickness between the inner round surface 3a and the outer round surface 3b is thin and that the thickness is smaller than 0.5% of double (a diameter) the distance from the central axis C1 to the outer round surface 3b.

Figure 2:
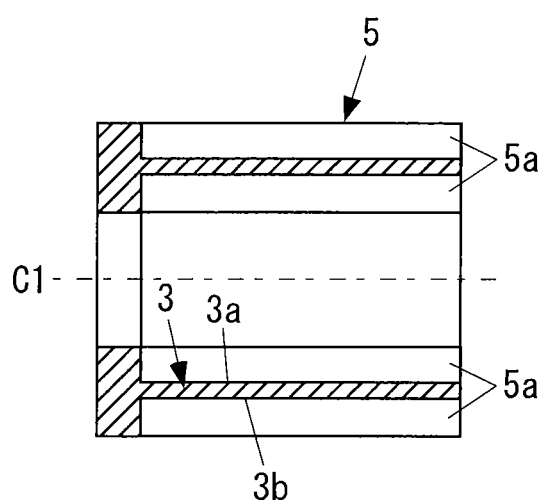
FIG. 2 illustrates a material having a much stock sufficient for obtaining the thin-walled material.
Figure 3:
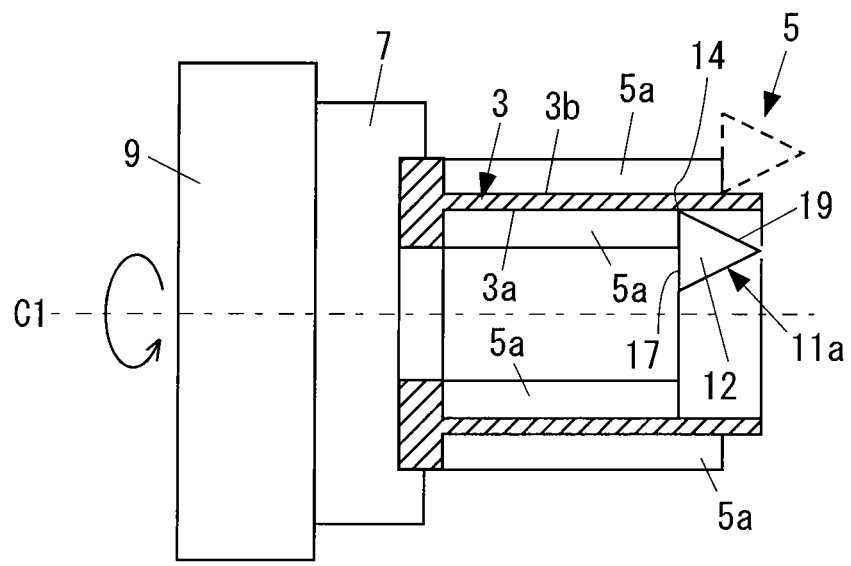
FIG. 3 is an explanatory diagram of the cutting method according to the first embodiment of the present invention.
Figure 4:
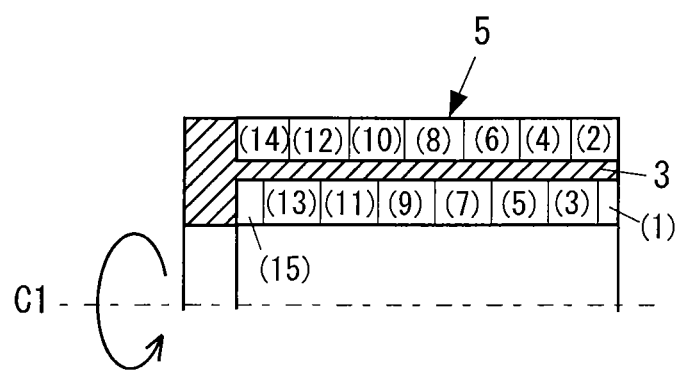
FIG. 4 illustrates cutting order in the first embodiment of the present invention.

FIGS. 2 to 4 are explanatory diagrams of the method of cutting the thin-walled material 3 according to the first embodiment of the present invention and FIG. 5 is a flowchart illustrating the method of cutting the thin-walled material 3 according to the first embodiment of the present invention. A description will be provided with reference to these drawings.

A step S1 is a material preparation process, and in this step, as shown in FIG. 2, a material 5 having a sufficient much stock 5a (that is, cutting portion or cutting margin) for obtaining the thin-walled material 3 is prepared. The material 5 is a material which has already been subjected to rough cutting, but not subjected to semi-cutting (semi-finish cutting). In addition, the sufficient much stock 5a means that the thickness of the much stock 5a for obtaining the thin-walled material 3 is sufficient, and the expression "sufficient" means that it has rigidity to the extent that chattering vibration or deformation does not occur in the material 5 at the time of cutting. The expression "semi-cutting (semi-finish cutting)" means cutting which makes a remaining margin for finish lathe-turning be equal to or less than 2.5 mm or be equal to or less than 50% of the thickness of a cutting target portion.

A step S2 is a material fixation process, and in this step, the material 5 prepared in the step S1 is fixed to a rotating table 9 through a mounting tool 7 (refer to FIG. 3).

A step S3 is a partial cutting process of an inner surface, and in this step, the inner round surface 3a is cut by a desired distance within the predetermined range by feeding a cutting tool having a cutting edge (that is, a tip) 11a relative to the material 5 by the desired distance from one end side to the other end side of the central axis C1 (in the example of FIG. 3, in the direction parallel to the central axis C1) while rotating the material 5 around the central axis C1 of the thin-walled material 3.

Specifically, as shown in FIG. 3, the material 5 is rotated around the central axis C1 of the thin-walled material 3 by rotating the rotating table 9 and also a cutting position by the cutting tool in the radial direction (the direction vertical to the central axis C1) of the thin-walled material 3 is fitted to a position of the inner round surface 3a. In this state, the cutting tool is fed a short distance in the direction parallel to the central axis C1 from one end side (the right side in FIG. 3) of the material 5 toward the other end.

In this way, the inner round surface 3a can be finished over the range of the distance. In addition, in the cutting method of the present invention, the central axis is an axis which becomes a rotation center of the material 5 in cutting, and the radial direction is a direction of a radius centered on the rotation center of the material 5 in cutting. Also, in this example, a desired distance within the predetermined range means a short distance in the range of one-fifth to one-tenth of the axial length of the predetermined range.

A step S4 is a partial cutting process of an outer surface, and in this step, the outer round surface 3b is cut by a desired distance within the predetermined range by feeding the cutting tool relative to the material 5 by the desired distance from one end side to the other end side of the central axis C1 (in the example of FIG. 3, in the direction parallel to the central axis C1) while rotating the material 5 around the central axis C1.

Specifically, the material 5 is rotated around the central axis C1 of the thin-walled material 3 by rotating the rotating table 9 and also a cutting position according to the cutting tool in the radial direction of the thin-walled material 3 is fitted to a position of the outer round surface 3b. In this state, the cutting tool is fed a short distance in the direction parallel to the central axis C1 from one end side (the right side in FIG. 3) of the thin-walled material 3 toward the other end. In this way, the outer round surface 3b can be finished over the range of the distance. Also, in this example, a desired distance within the predetermined range means a short distance in the range of one-fifth to one-tenth of the axial length of the predetermined range.

In a step S5, in a case where the whole of the inner round surface 3a and the outer round surface 3b is not completed over the predetermined range described above, the process returns to the step S3 and the step S3 and the step S4 are performed again. In this manner, by alternately repeating the step S3 and the step S4 with respect to the material 5 which is not subjected to semi-cutting (semi-finish cutting), the inner round surface 3a and the outer round surface 3b are gradually finished. In addition, among the step S3 and the step S4, the process may also be begun from the step S3 or may also be begun from the step S4.

Described with reference to FIG. 4, cutting is performed in order of the numbers in parentheses of the drawing. That is, the inner round surface 3a and the outer round surface 3b are alternately formed little by little in order of each portion denoted by the numbers (1), (2), (3), ..., (14), and (15). In this manner, the inner round surface 3a and the outer round surface 3b are finished over a predetermined range by performing the finish lathe-turning of the steps S3 and S4 without performing the semi-cutting (the semi-finish cutting).

Preferably, as shown by the respective much stocks (1) to (15) of FIG. 4, in each step S3 (the partial cutting process of the inner surface), the cutting tool is fed in the direction parallel to the central axis C1 up to a position entered in the axial direction by a distance within the desired distance into an unformed region of the outer round surface 3b side, and in each step S4 (the partial cutting process of the outer surface), the cutting tool is fed in the direction parallel to the central axis C1 up to a position entered in the axial direction by a distance within the desired distance into an unformed region of the inner round surface 3a side.

That is, a cutting depth from one end (the right end in the drawing) of the material 5 is set such that at the point in time when the step S3 has ended, the cutting depth of the inner round surface 3a side becomes deeper and at the point in time when the step S4 has ended, the cutting depth of the outer round surface 3b side becomes deeper. In this way, when cutting the inner round surface 3a side or the outer round surface 3b side, it is possible to support a cutting force by the much stock 5a of the side opposite to the cutting side over a longer range than in a cutting tool feed direction. That is, even if the wall thickness between the inner round surface 3a and the outer round surface 3b is thin, it is possible to support the cutting force by the much stock 5a. In addition, in the first embodiment, the feed direction is a direction which is perpendicular to the rotation direction of the material 5 and has a component of the direction parallel to the central axis, and is a cutting tool moving direction along a cutting surface (for example, the inner round surface 3a) of the material 5.

Also, in the cutting method (that is, a lathe turning method) described above, as shown in FIG. 3, 6A, or 7A, the cutting edge 11a of the cutting tool (bite) has a feed-side surface 17 (in this example, a plane surface), which faces the feed direction side of the tool, and a material-side surface (in this example, a plane surface) 19 which faces the cutting surface (cutting surface) side of the material 5.

The angle that the feed-side surface 17 makes with the material-side surface (that is, a relief face) 19 is an acute angle. In addition, the feed-side surface 17 and the material-side surface 19 extend in the direction vertical to a plane of paper, for example, in FIG. 3, 6A, or 7A (the direction perpendicular to the central axis C1).

Figure 6A:
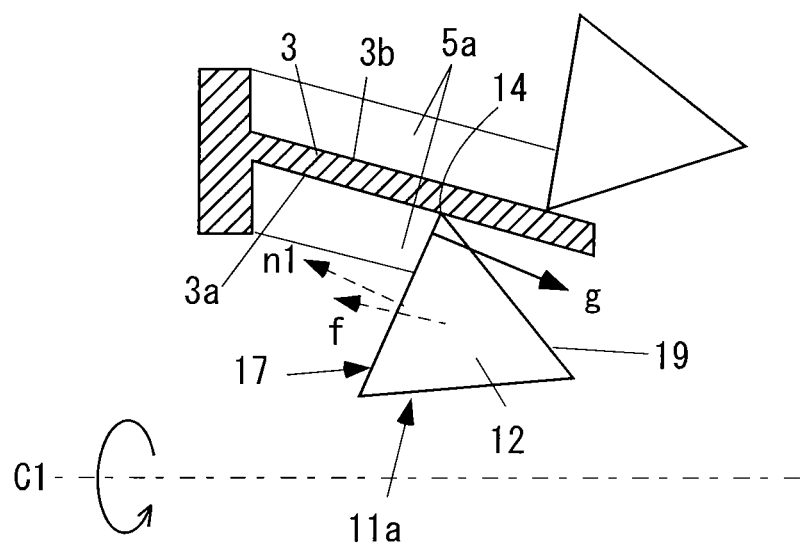
FIG. 6A is a diagram of the first embodiment of the present invention describing a cutting edge direction of a cutting tool according to a first tool direction control method.
Figure 7A:
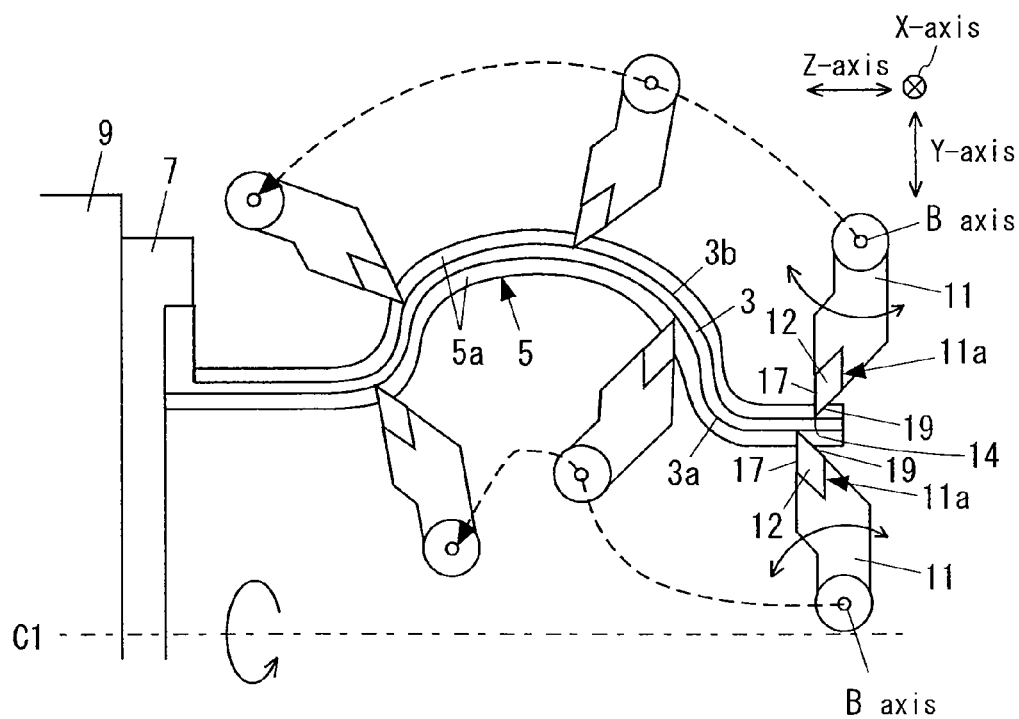
FIG. 7A is a diagram of the first embodiment of the present invention describing a cutting edge direction of a cutting tool according to a second tool direction control method.

Also, in FIG. 3, 6A, or 7A, reference numeral 12 denotes a rake face of the cutting edge 11a, and reference numeral 14 denotes a corner which is located at a place where a side coming into contact with the rake face 12 in the feed-side surface 17 and a side coming into contact with the rake face 12 in the material-side surface 19 intersect with each other. The corner 14 is applied to the cutting surface (that is, the inner round surface or the outer round surface) of the material 5 at the time of cutting of the material 5.

In the case of using such a cutting edge 11a, it is preferable to carry out the cutting method of the first embodiment by a first or second tool direction regulating method which is described below.

First Tool Direction Regulating Method

The first tool direction regulating method is preferably carried out when cutting the inner round surface 3a at a normal-line constant region where a normal line to the inner round surface 3a is constant (zero or another value) regardless of a position in a central axis direction (an axial location). Similarly, the first tool direction regulating method is preferably carried out when cutting the outer round surface 3b at a normal-line constant region where a normal line to the outer round surface 3b is constant regardless of an axial location. The first tool direction regulating method is as follows.

As shown in FIG. 6A, the direction (the normal) n1 of the feed-side surface 17 (that is, the plane surface 17) is set to be a direction close to the feed direction f of the cutting tool 11 and inclined just a little bit (for example, 0.5 to 5 degrees) from the feed direction f to the cutting surface side. By this, since chips fly out of a much stock in a "chip advancing direction g" in FIG. 6A, it is possible to prevent the chips from touching a thin wall between the inner round surface 3a and the outer round surface 3b. In addition, the chip advancing direction g is a direction which is nearly perpendicular to the feed-side surface 17 and the reverse direction of the feed-side surface 17, and if an inclination of the feed-side surface 17 described above is set to be too large, since smooth cutting is not able to be performed, it is preferable to incline the face just a little bit (for example, 0.5 to 5 degrees), as described above.

Figure 6B:
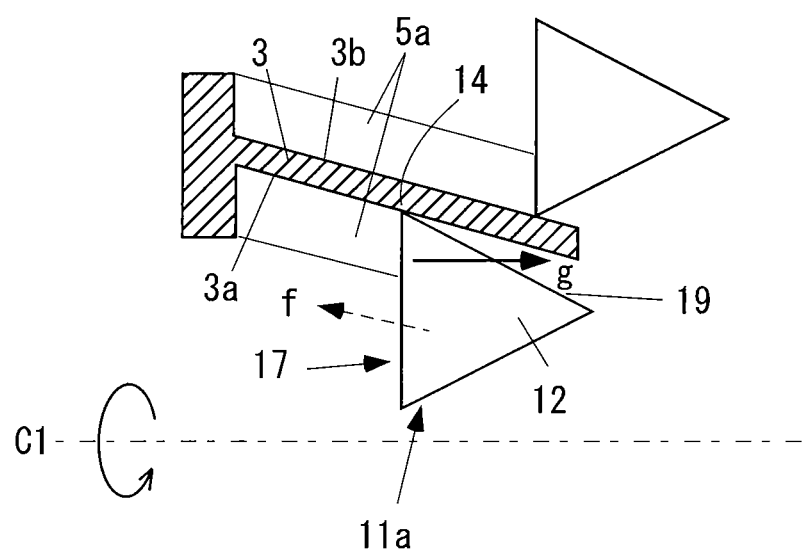
FIG. 6B is a diagram illustrating a prior example corresponding to FIG. 6A.

On the other hand, as shown in FIG. 6B, in a case where the direction (the normal) of the feed-side surface 17 is set to be a direction inclined from the feed direction f of the cutting tool to the side opposite to the cutting surface, the chips touch the thin wall, thereby deforming the thin walled material 3 which is a ring shape in cross-section.

Second Tool Direction Regulating Method

The second tool direction regulating method is preferably carried out when cutting the inner round surface 3a at a normal-line varying region where a normal line to the inner round surface 3a varies according to an axial location. Similarly, the second tool direction regulating method is preferably carried out when cutting the outer round surface 3b at a normal-line varying region where a normal line to the outer round surface 3b varies according to the axial location. The second tool direction regulating method is as follows.

FIG. 7A is an explanatory diagram of the second tool direction regulating method. The step S3 described above is performed while controlling the direction of the cutting tool 11 such that at the normal-line varying region of the inner round surface 3a, the angle that the feed-side surface 17 makes with the cutting surface (a cutting surface at a cutting place) of the material 5 becomes the angle in the range of 80 degrees or more and 100 degrees or less, preferably, 85 degrees or more and 95 degrees or less.

Similarly, the step S4 described above is performed while controlling the direction of the cutting tool 11 such that at the normal-line varying region of the outer round surface 3b, the angle that the feed-side surface 17 makes with the cutting surface of the material 5 becomes the angle in the range of 80 degrees or more and 100 degrees or less, preferably, 85 degrees or more and 95 degrees or less. More specifically, it is as follows.

An NC cutting apparatus (a Numerical Control Machine) having the cutting tool 11 performs cutting by the second tool direction regulating method by using Numerical Control. That is, the cutting tool 11 is moved in the feed direction while making the corner 14 of the cutting edge 11a of the cutting tool 11 be positioned at the inner round surface 3a (or the outer round surface 3b) and also making the angle that the feed-side surface 17 makes with the cutting surface of the material 5 be the angle in the range of 80 degrees or more and 100 degrees or less, preferably, 85 degrees or more and 95 degrees or less, by controlling an angle of rotation around a B axis of the cutting tool, a position in an X-axis direction of the cutting tool, a position in a Y-axis direction of the cutting tool, and a position in a Z-axis direction of the cutting tool by the numerical control, as shown in FIG. 7A. At this time, the material 5 is in a state where the material 5 is rotated around the central axis C1 in the same way as the aforementioned. Such numerical control is carried out based on NC data created on the basis of shape data of the thin-walled material. The shape data of the thin-walled material is, for example, CAD (Computer Aided Design) data of the thin-walled material.

In addition, in the numerical control, as shown in FIG. 7A, a Z axis is parallel to the central axis C1, the B axis is perpendicular to the Z axis, an X axis is perpendicular to the Z axis, and a Y axis is perpendicular to both the Z axis and the X axis. In FIG. 7A, a dashed arrow represents an outline of a locus of the B axis.

Figure 7B:
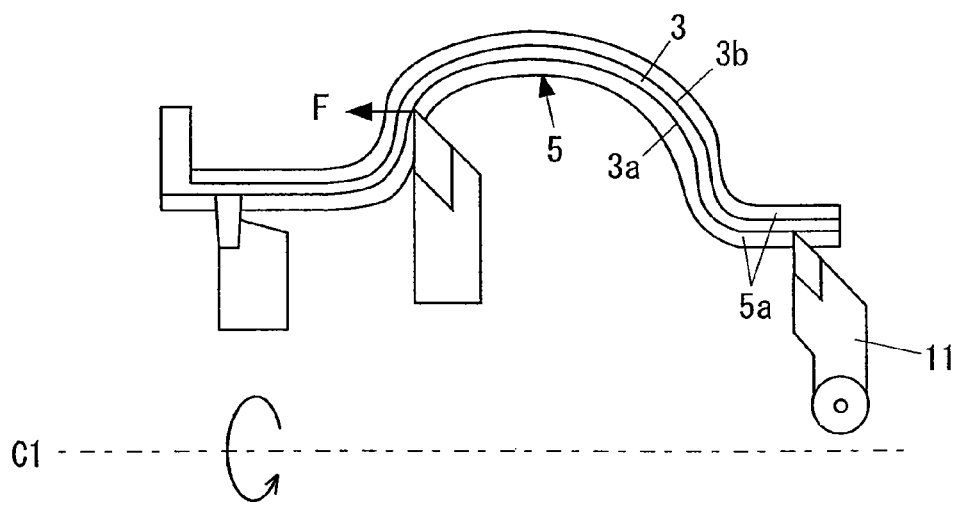
FIG. 7B is a diagram illustrating a prior example corresponding to FIG. 7A.

The effects which are obtained by the second tool direction regulating method are described in comparison with a case in the past. In the past, as shown in FIG. 7B, in a case where the angle that the feed-side surface 17 of the cutting edge 11a makes with the cutting surface of the material 5 has varied according to an axial location, for every cutting area in a central axis direction, a cutting edge which is mounted on the cutting tool 11 has been exchanged into a cutting edge appropriate to the area. Also, in the past, since at each axial location, the feed-side surface 17 of the cutting edge 11a has not made the angle in the range of 80 degrees or more and 100 degrees or less with the cutting surface of the material 5, a cutting force F acting on the material 5 has become larger.

In contrast to this, in the second tool direction regulating method in the first embodiment, since during cutting of the inner round surface 3a or the outer round surface 3b, the direction of the cutting tool 11 is controlled such that the angle that the feed-side surface 17 makes with the cutting surface of the material 5 becomes the angle in the range of 80 degrees or more and 100 degrees or less, preferably, 85 degrees or more and 95 degrees or less, the entire cutting region can be cut by using one cutting edge without exchanging the cutting edge for every cutting region in the central axis direction. In addition, in the second tool direction regulating method in the first embodiment, since during cutting of the inner round surface 3a or the outer round surface 3b, the angle that the feed-side surface 17 makes with the cutting surface of the material 5 can be maintained at an angle close to the angle in the range of 80 degrees or more and 100 degrees or less, preferably, 85 degrees or more and 95 degrees or less, the cutting force F acting on the material 5 can be suppressed to a lower level. Accordingly, in the above-described step S3 or S4 in the first embodiment, it is possible to make a cutting depth of the cutting edge into the material 5 deep, whereby the inner round surface 3a or the outer round surface 3b can be cut in one shot without performing the semi-cutting (the semi-finish cutting). In addition, in the second tool direction regulating method, in the case of making the angle that the feed-side surface 17 makes with the cutting surface of the material 5 be the angle in the range of 80 degrees to 90 degrees, the angle that the feed-side surface 17 makes with the material-side surface 19 may be the angle in the range of 90 degrees to 100 degrees.

In the method of cutting the thin-walled material 3 according to the first embodiment of the present invention described above, since without performing the semi-finish cutting, the step S3 and the step S4 are alternately repeated in such a manner that in the step S3, the inner round surface 3a is cut by a desired distance by feeding the cutting tool 11 relative to the material 5 by the desired distance in the direction parallel to the central axis C1 while rotating the material 5 around the central axis C1 and in the step S4, the outer round surface 3b is cut by a desired distance by feeding the cutting tool relative to the material 5 by the desired distance in the direction parallel to the central axis C1 while rotating the material 5 around the central axis C1, it is possible to support the cutting force F by the remaining much stock 5a.

That is, the cutting force F when performing the step S3 is supported by the much stock 5a remaining on the outer circumstance side, and the cutting force F when performing the step S4 is supported by the much stock 5a remaining on the inner circumstance side. In this way, it is possible to perform the finish lathe-turning without using a chattering vibration preventing retainer and without causing chattering vibration or deformation. As a result, it is possible to obtain a constant wall thickness in relation to the circumferential direction and the well-balanced thin-walled material 3 can be fabricated.

In addition, as in a case where the semi-cutting (the semi-finish cutting) is performed with respect to a surface which is first subjected to lathe turning and the opposite surface which is later subjected to lathe turning is cut without performing the semi-cutting (the semi-finish cutting), in a case where the thicknesses of the much stocks are different from each other at the surface in which the lathe turning is performed and the opposite surface, if a surface where the thickness of the much stock is thin is first subjected to the lathe turning, due to rigidity of the much stock which is later subjected to the lathe turning, it is possible to perform the lathe turning without causing chattering. This state is shown in FIGS. 8A and 8B.

Figure 8A:
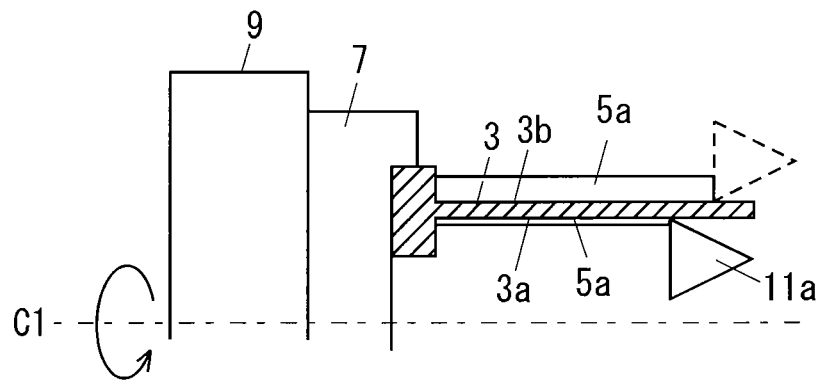
FIG. 8A is a diagram illustrating a case where a cylindrical surface has been subjected to semi-cutting.

FIG. 8A is a diagram illustrating a case where a cylindrical surface has been subjected to the semi-cutting. In this example, the semi-finish lathe-turning may be performed with respect to a surface (an inner surface) which is first subjected to the lathe turning. Even if the finish lathe-turning is performed thereafter, chattering is not generated by virtue of the much stock of the opposite surface (an outer surface). Also, in this example, the semi-finish lathe-turning must not be performed with respect to a surface (an outer surface) which is later subjected to the lathe turning. If the much stock is large, rigidity exists, so that chattering is not generated.

Figure 8B:
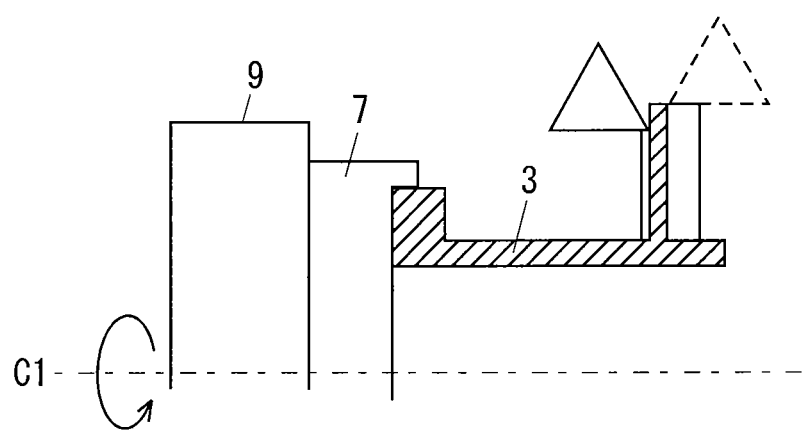
FIG. 8B is a diagram illustrating a case where a circular plate surface has been subjected to semi-cutting.

FIG. 8B is a diagram illustrating a case where a circular plate surface has been subjected to the semi-cutting. In this example, the semi-finish lathe-turning may be performed with respect to a surface (the left surface) which is first subjected to the lathe turning. Even if the finish lathe-turning is performed thereafter, chattering is not generated by virtue of the much stock of the opposite surface (the right surface). Also, in this example, the semi-finish lathe-turning must not be performed with respect to a surface (the right surface) which is later subjected to the lathe turning. If the much stock is large, rigidity exists, so that chattering is not generated.

Also, in each of the steps S3 and S4, since the cutting tool is fed to a position entered in the axial direction by a distance within the desired distance into an uncut region in which the much stock 5a still remains on the side opposite to the cutting surface, even in a case where the wall thickness between the inner round surface 3a and the outer round surface 3b is thin, it is possible to increase a distance, in which the cutting tool can be fed, such that the chattering vibration is not generated.

Also, in the first embodiment described above, at the time of switching between the cutting of the inner round surface 3a side and the cutting of the outer round surface 3b side, it is possible to make the material 5 remain mounted on the mounting tool 7 and the rotating table 9. Accordingly, deviation of the shaft center of the thin-walled material 3 from the central axis C1 due to remounting of the material 5 on the mounting tool 7 and the rotating table 9 does not occur.

Example 1

Figure 9:
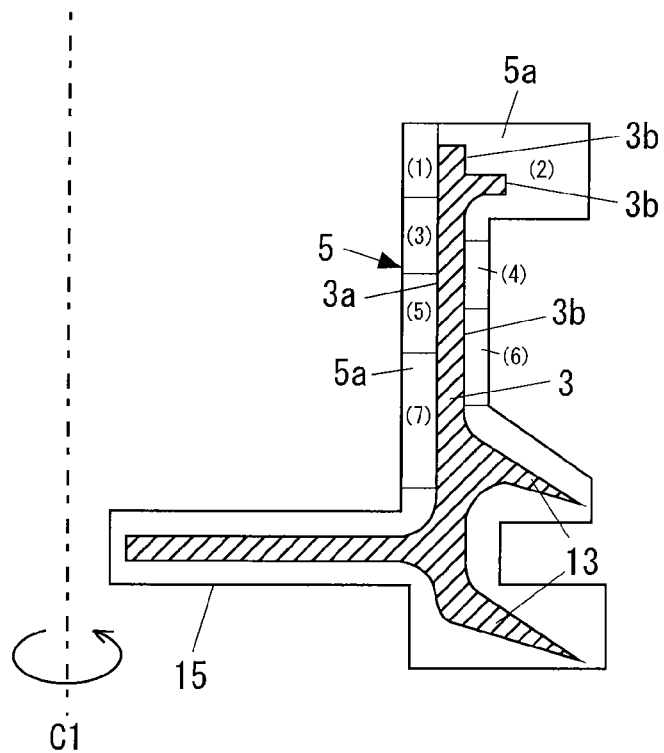
FIG. 9 illustrates Example 1 of the cutting method according to the first embodiment of the present invention.

FIG. 9 illustrates another example of the cutting method according to the first embodiment described above.

In this drawing, the thin-walled material 3 has a labyrinth seal portion 13. Also, the material 5 is a forging subjected to rough cutting. Also, in this example, a support portion 15 of the material 5 is fixed to a rotating table (not shown) through an appropriate mounting tool (not shown) and cutting of the thin-walled material 3 is then performed.

In this example, the cutting method according to the first embodiment is applicable to an inner round surface 3a portion and an outer round surface 3b portion, which are shown in the drawing, and the steps S3 and S4 described above are performed alternately and repeatedly with respect to the inner round surface 3a portion and the outer round surface 3b portion in order of the numbers in parentheses in the drawing. That is, the inner round surface 3a and the outer round surface 3b are alternately formed little by little in order of each portion denoted by the numbers (1), (2), (3), ..., (6), and (7).

Also in this example, the step S3 is performed while fitting a cutting position by the cutting tool in the radial direction of the thin-walled material 3 to a position of the inner round surface 3a, and the step S4 is performed while fitting a cutting position by the cutting tool in the radial direction of the thin-walled material 3 to a position of the outer round surface 3b.

In a portion of the number (2) in FIG. 9, since a radial location of the outer round surface 3b varies according to a position in the central axis C1 direction, a cutting position in the radial direction is changed according to a feed amount of the cutting tool in the direction parallel to the central axis C1.

Other points in the cutting method of Example 1 are the same as the first embodiment described above.

Example 2

Figure 10:
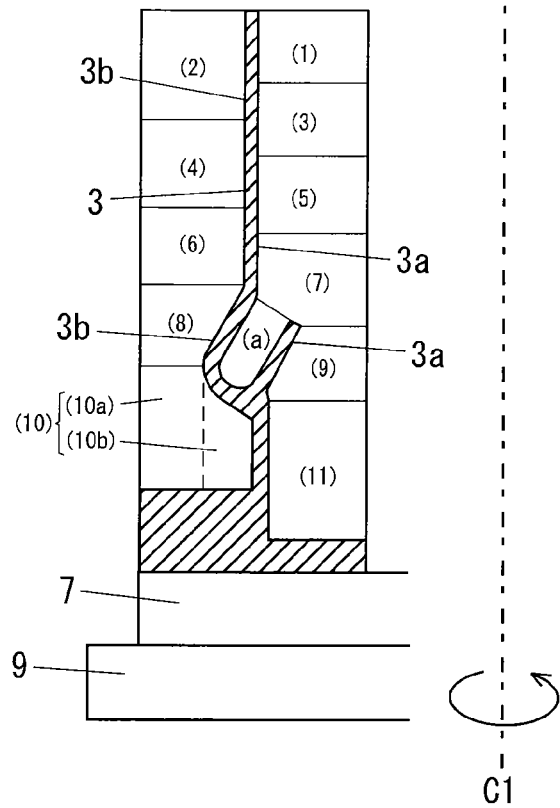
FIG. 10 illustrates Example 2 of the cutting method according to the first embodiment of the present invention.

FIG. 10 illustrates another example of the cutting method according to the first embodiment described above.

In this drawing, the thin-walled material 3 is a material constituting a casing of a combustor and is a stationary material which does not rotate at the time of use. Also, the material 5 has been subjected to rough cutting. Also, in this example, the thin-walled material 3 is fixed to the rotating table 9 through the mounting tool 7 and cutting of the thin-walled material 3 is then performed.

In this example, the steps S3 and S4 described above are performed alternately and repeatedly with respect to the inner round surface 3a portion and the outer round surface 3b portion, which are shown in the drawing, in order of the numbers in parentheses in the drawing. That is, the inner round surface 3a and the outer round surface 3b are alternately formed little by little in order of each portion denoted by the numbers (1), (2), (3), . . . , (10), and (11).

In addition, cutting of a portion of the number (10) may also be performed such that a portion of the number (10a) is first cut and a portion of the number (10b) is then cut by the step S3. Also, cutting of a hole portion denoted by the symbol (a) may be performed after cutting of a portion of the number (11).

Also in Example 2, the step S3 is performed while fitting a cutting position according to the cutting tool in the radial direction of the thin-walled material 3 to a position of the inner round surface 3a, and the step S4 is performed while fitting a cutting position according to the cutting tool in the radial direction of the thin-walled material 3 to a position of the outer round surface 3b. In the portions numbered (8), (9), and (10) in FIG. 10, since positions in the radial direction of the inner round surface 3a or the outer round surface 3b vary according to a position in the central axis C1 direction, the cutting positions in the radial direction are changed according to feed amounts of the cutting tool in the direction parallel to the central axis C1.

Other points in the cutting method of Example 2 may be the same as the first embodiment described above.

Second Embodiment

FIG. 11A is a transverse cross-sectional view illustrating the thin-walled material 3 which is fabricated by a cutting method according to a second embodiment of the present invention and FIG. 11B is a cross-sectional view taken along line B-B of FIG. 11A.

In this example, the thin-walled material 3 is a material which is provided at a rotating machine such as a jet engine, a gas turbine, or a supercharger and rotationally driven around the central axis C1 of the rotating machine. For example, the thin-walled material 3 may be the rotating shaft itself of the rotating machine or may also be a material which is mounted on and fixed to the rotating shaft.

As shown in FIGS. 11A and 11B, the thin-walled material 3 has a flange 21 which extends outward or inward in the radial direction (that is, the direction perpendicular to the central axis C1) with respect to the central axis C1 thereof from the inner round surface 3a or the outer round surface 3b, and the flange 21 has a first side surface 21a, which faces one side in the direction parallel to the central axis C1, and a second side surface 21b, which faces the other side in the direction parallel to the central axis C1, over a predetermined range (in this example, from the outer round surface 3b to an outer round end of the flange 21) in the radial direction. Also, in this example, the thin-walled material 3 has the inner round surface 3a and the outer round surface 3b, which are centered on the central axis C1. Also, in this example, the first side surface 21a and the second side surface 21b face in the directions opposite to each other and parallel to the central axis C1.

In the second embodiment, the expression "thin-walled" in the thin-walled material 3 means that the thickness between the first side surface 21a and the second side surface 21b is thin and that the thickness is smaller than 0.5% of double (a diameter) the distance from the central axis C1 to the outer end of the flange 21 in the radial direction.

Figure 13:
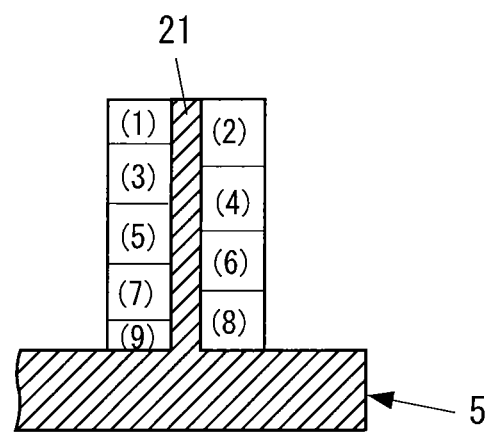
FIG. 13 illustrates cutting order in the second embodiment of the present invention.
Figure 14:
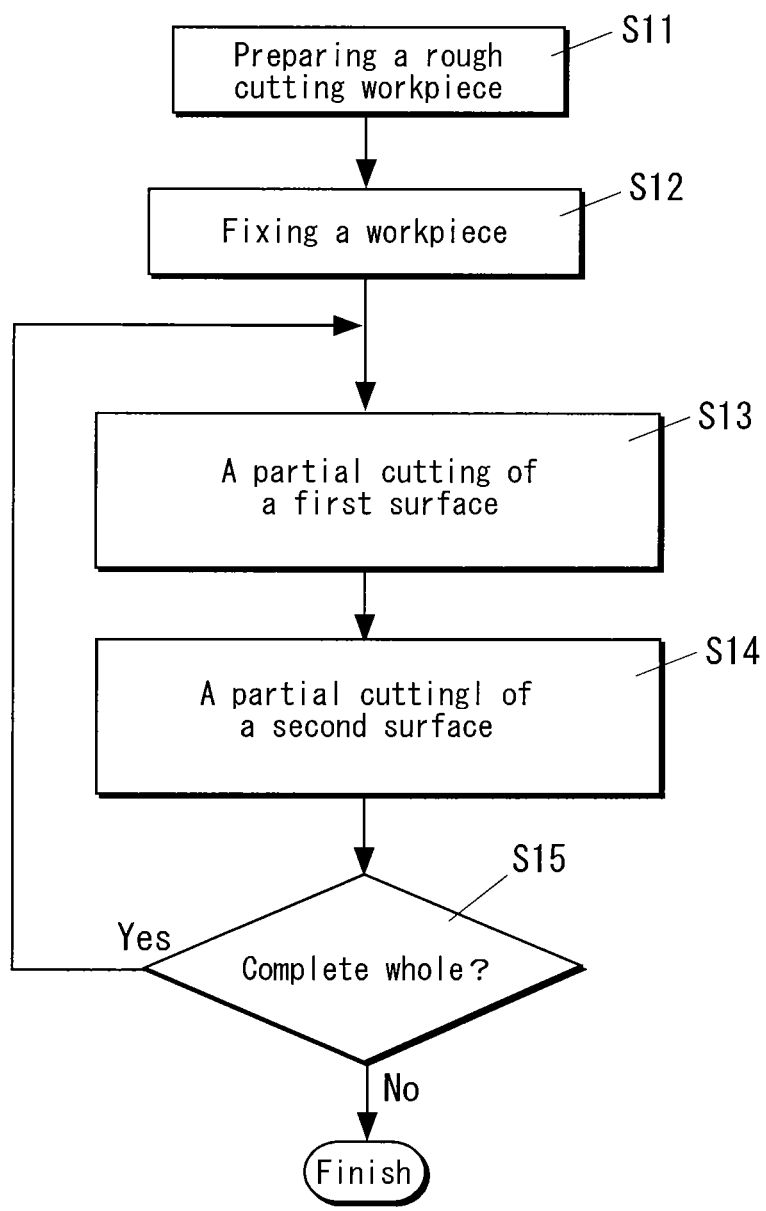
FIG. 14 is a flowchart illustrating the method of cutting a thin-walled material according to the second embodiment of the present invention.

FIGS. 12 and 13 are explanatory diagrams of the method of cutting the thin-walled material 3 according to the second embodiment and FIG. 14 is a flowchart illustrating the method of cutting the thin-walled material 3 according to the second embodiment of the present invention. A description will be provided below with reference to these drawings.

A step S11 is a material preparation process, and in this step, as shown in FIG. 12, the material 5 having the much stock 5a sufficient for obtaining the thin-walled material 3, that is, the flange 21 is prepared. The material 5 is a material which is already subjected to the rough cutting, but not subjected to the semi-cutting (the semi-finish cutting).

A step S12 is a material fixation process, and in this step, the material 5 prepared in the step S11 is fixed to the rotating table 9 through the mounting tool 7 (refer to FIG. 12).

A step S13 is a partial cutting process of the first side surface, and in this step, the first side surface 21a is cut by a desired distance within the predetermined range by feeding the cutting tool having the cutting edge 11a relative to the material 5 by the desired distance from the outside in the radial direction to the inside in the radial direction or from the inside in the radial direction to the outside in the radial direction (in the example of FIG. 11A, in the radial direction) while rotating the material 5 around the central axis C1 of the thin-walled material 3.

Specifically, as shown in FIG. 12, the material 5 is rotated around the central axis C1 of the thin-walled material 3 by rotating the rotating table 9 and also a cutting position by the cutting tool in the direction parallel to the central axis C1 is fitted to a position of the first side surface 21a. In this state, the cutting tool is fed a short distance in the radial direction from the outer round end side of the flange 21 toward the central axis C1. In this way, the first side surface 21a can be finished over the range of the distance. Also, in this example, a desired distance within the predetermined range means a short distance in the range of one-fifth to one-tenth of the axial length of the predetermined range.

A step S14 is a partial cutting process of the second side surface, and in this step, the second side surface 21b is cut by a desired distance within the predetermined range by feeding the cutting tool relative to the material 5 by the desired distance from the outside in the radial direction to the inside in the radial direction or from the inside in the radial direction to the outside in the radial direction (in the example of FIG. 11A, in the radial direction) while rotating the material 5 around the central axis C1.

Specifically, the material 5 is rotated around the central axis C1 of the thin-walled material 3 by rotating the rotating table 9 and also a cutting position by the cutting tool in the direction parallel to the central axis C1 is fitted to a position of the second side surface 21b. In this state, the cutting tool is fed a short distance in the radial direction from the outer round end side of the flange 21 toward the central axis C1. In this way, the second side surface 21b can be finished over the range of the distance. Also, in this example, a desired distance within the predetermined range means a short distance in the range of one-fourth to one-tenth of the axial length of the predetermined range.

In a step S15, in a case where the first side surface 21a and the second side surface 21b are not finished over the predetermined range described above, the process returns to the step S13 and the step S13 and the step S14 are performed again. In this manner, by alternately repeating the step S13 and the step S14 with respect to the material 5 which is not subjected to the semi-cutting (the semi-finish cutting), the first side surface 21a and the second side surface 21b are gradually finished. In addition, among the step S13 and the step S14, the process may also be begun from the step S13 or the process may also be begun from the step S14.

Described with reference to FIG. 13, cutting is performed in order of the numbers in parentheses of the drawing. That is, the first side surface 21a and the second side surface 21b are alternately formed little by little in order of each portion denoted by the numbers (1), (2), (3), ..., (8), and (9). In this manner, the first side surface 21a and the second side surface 21b are finished over a predetermined range by performing the finish lathe-turning of the steps S13 and S14 without performing the semi-cutting.

Preferably, as shown by the respective much stocks (1) to (9) of FIG. 13, in each step S13 (the partial cutting process of the first side surface), the cutting tool is fed in the radial direction up to a position entered in the radial direction by a distance within the desired distance into a second side surface unformed region of the second side surface 21b side, and in each step S14 (the partial cutting process of the second side surface), the cutting tool is fed in the radial direction up to a position entered in the radial direction by a distance within the desired distance into a first side surface unformed region of the first side surface 21a side.

That is, a cutting depth in a direction from the outer round end of the flange 21 toward the central axis C1 is set such that at the point in time when the step S13 has ended, the cutting depth of the first side surface 21a side becomes deeper and at the point in time when the step S14 has ended, the cutting depth of the second side surface 21b side becomes deeper. In this way, when cutting the first side surface 21a side or the second side surface 21b side, it is possible to support the cutting force F by the much stock 5a of the side opposite to the cutting side over a longer range in the cutting tool feed direction. That is, even if the wall thickness between the first side surface 21a and the second side surface 21b is thin, it is possible to support the cutting force F by the much stock 5a. In addition, in the second embodiment, the feed direction is a direction from the outside in the radial direction to the inside in the radial direction or a direction from the inside in the radial direction to the outside in the radial direction and is a cutting tool moving direction along the cutting surface (for example, the first side surface 21a) of the material 5.

Also, in the cutting method (that is, the lathe turning method) of the second embodiment, the cutting tool (bite) may be the same as that in the first embodiment. That is, the cutting tool has the feed-side surface 17 (in this example, a plane surface), which faces the feed direction side, and the material-side surface 19 (in this example, a plane surface), which faces the cutting surface (the cutting surface) side of the material 5. The angle that the feed-side surface 17 makes with the material-side surface 19 is an acute angle.

In addition, the feed-side surface 17 and the material-side surface (that is, the relief face) 19 extend in the direction vertical to a plane of paper, for example, in FIG. 12 (the direction perpendicular to the central axis C1). Also, in the drawing, reference numeral 12 denotes a rake face of the cutting edge 11a, and reference numeral 14 denotes a corner which is located at a place where a side coming into contact with the rake face 12 in the feed-side surface 17 and a side coming into contact with the rake face 12 in the material-side surface 19 intersect with each other. The corner 14 is applied to the cutting surface (that is, the first side surface 21a or the second side surface 21b) of the material 5 at the time of cutting of the material 5.

In this case, it is preferable to perform the above-described cutting method (that is, the lathe turning method) according to the second embodiment by the first or second tool direction regulating method, as described below, in the same way as the case of the first embodiment.

First Tool Direction Regulating Method

The first tool direction regulating method is preferably carried out when cutting the first side surface 21a at a normal-line constant tapered region where a normal line to the first side surface 21a is constant regardless of a radial location. Similarly, the first tool direction regulating method is preferably carried out when cutting the second side surface 21b at a normal-line constant region where a normal line to the second side surface 21b is constant regardless of a radial location.

In the first tool direction regulating method, in the same way as the case of the first embodiment, the direction (the normal) of the feed-side surface 17 is set to be a direction close to a feed direction of the cutting tool and inclined only a little bit (for example, 0.5 to 5 degrees) from the feed direction to the cutting surface side.

Second Tool Direction Regulating Method

The second tool direction regulating method is preferably carried out when cutting the first side surface 21a at a normal-line varying region where a normal line to the first side surface 21a varies according to a radial location. Similarly, the second tool direction regulating method is preferably carried out when cutting the second side surface 21b at a normal-line varying region where a normal line to the second side surface 21b varies according to a radial location.

In the second tool direction regulating method, in the same way as the case of the first embodiment, the step S13 described above is performed while controlling the direction of the cutting tool 11 such that at the normal-line varying region of the first side surface 21a, the angle that the feed-side surface 17 makes with the cutting surface of the material 5 becomes the angle in the range of 80 degrees or more and 100 degrees or less, preferably, 85 degrees or more and 95 degrees or less. Similarly, the step S14 described above is performed while controlling the direction of the cutting tool 11 such that at the normal-line varying region of the second side surface 21b, the angle that the feed-side surface 17 makes with the cutting surface of the material 5 becomes the angle in the range of 80 degrees or more and 100 degrees or less, preferably, 85 degrees or more and 95 degrees or less. Other points in the second tool direction regulating method in the second embodiment are the same as the first tool direction regulating method in the first embodiment.

In this way, in the same way as the case of the first embodiment, even in a case where the normal line to the first side surface 21a or the second side surface 21b varies according to a radial location, the first side surface 21a or the second side surface 21b can be cut in one shot while suppressing the cutting force F acting on the material 5 to a lower level, without exchanging the cutting tool 11.

In the cutting method according to the second embodiment of the present invention described above, since without performing the semi-finish cutting, the step S13 and the step S14 are alternately repeated in such a manner that in the step S13, the first side surface 21a is cut by a desired distance by feeding the cutting tool relative to the material by the desired distance in the radial direction while rotating the material around the central axis C1 and in the step S14, the second side surface 21b is cut by a desired distance by feeding the cutting tool relative to the material by the desired distance in the radial direction while rotating the material around the central axis C1, it is possible to support the cutting force F by the remaining much stock 5a.

That is, the cutting force F when performing the step S13 is supported by the much stock 5a which remains on the second side surface 21b side, and the cutting force F when performing the step S14 is supported by the much stock 5a which remains on the first side surface 21a side. In this way, the finish lathe-turning can be performed without using a chattering vibration preventing retainer and without causing chattering vibration or deformation. As a result, the flange 21 having a constant thin wall thickness in relation to a circumferential direction can be obtained and the highly-precise thin-walled material 3 can be fabricated.

In addition, the thin-walled material 3 in the first or second embodiment described above does not need to be the rotating body.

Figure 15:
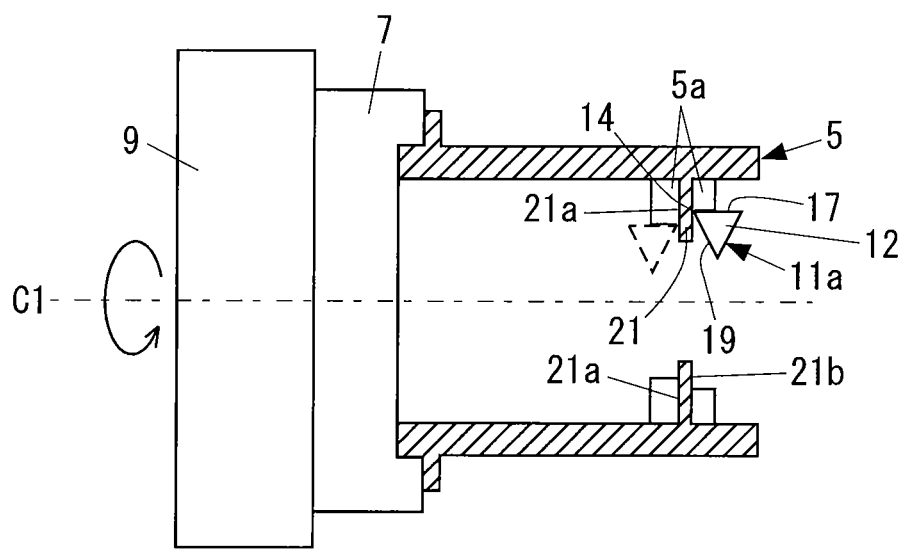
FIG. 15 is an explanatory diagram of the method of cutting a thin-walled material having an inner flange, to which the second embodiment of the present invention is applicable.

Also, in the second embodiment described above, the flange 21 of the thin-walled material 3 is an outer flange which extends in the radial direction from the outer round surface 3b. However, the flange 21 of the thin-walled material 3 may also be an inner flange which extends in the radial direction from the inner round surface 3a, as shown in FIG. 15. Also in this case, the cutting method of the second embodiment can be applied. In addition, in this case, the feed direction of the cutting tool is a radial direction from the inner round end of the flange 21, which is located on the central axis C1 side, toward the outer round end (a joined position of the flange 21 and the inner round surface 3a) of the flange 21 and other points may be the same as the second embodiment described above.

In addition, although the embodiments of the present invention have been described above, the embodiments of the present invention disclosed above are merely exemplifications and the scope of the present invention is not limited to these embodiments of the invention. The scope of the present invention is represented by the description of the claims and includes all modifications within the meaning and the scope, which are equivalent to the description of the claims. For example, other embodiments A to D described below may also be adopted solely or in combination.

Another Embodiment A

In the first embodiment described above, the steps S3 and S4 are alternately repeated. However, the steps S3 and S4 may also be performed simultaneously. That is, when the material 5 is rotated around the central axis C1, the step S3 of cutting the inner round surface 3a by feeding the cutting tool 11 relative to the material 5 from one end side to the other end side of the central axis C1 and the step S4 of cutting the outer round surface 3b by feeding the cutting tool 11, which is separate from, but the same as the above-mentioned cutting tool, relative to the material 5 from one end side to the other end side of the central axis C1 are performed simultaneously. Also as a result of this, the cutting force when cutting the inner round surface 3a is supported by the much stock 5a remaining on the outer round surface 3b side, and the cutting force when cutting the outer round surface 3b is supported by the much stock 5a remaining on the inner round surface 3a side. Accordingly, the thin-walled material 3 can be cut without using a chattering vibration preventing retainer and without causing chattering vibration. In this case, other points may be the same as the first embodiment.

Another Embodiment B

In the second embodiment described above, the steps S13 and S14 are alternately repeated. However, the steps S13 and S14 may also be performed simultaneously. That is, when the material 5 is rotated around the central axis C1, the step S13 of cutting the first side surface 21a by feeding the cutting tool 11 relative to the material 5 from the outside in the radial direction to the inside in the radial direction or from the inside in the radial direction to the outside in the radial direction and the step S14 of cutting the second side surface 21b by feeding the cutting tool 11, which is separate from, but the same as the above-mentioned cutting tool, relative to the material 5 from the outside in the radial direction to the inside in the radial direction or from the inside in the radial direction to the outside in the radial direction are performed simultaneously. Also as a result of this, the cutting force when cutting the first side surface 21a is supported by the much stock 5a remaining on the second side surface 21b side, and the cutting force when cutting the second side surface 21b is supported by the much stock 5a remaining on the first side surface 21a side. Accordingly, the thin-walled material 3 can be cut without using a chattering vibration preventing retainer and without causing chattering vibration. In this case, other points may be the same as the second embodiment.

Another Embodiment C

In the first embodiment described above, the steps S3 and S4 are performed with respect to the material 5 which has not been subjected to the semi-cutting. However, the steps S3 and S4 may also be performed with respect to the material 5 subjected to the semi-cutting (that is, the semi-finish lathe-turning). In this case, for example, in the step S1 described above, the material 5 subjected to the semi-cutting is prepared. Also, in this case, other points are the same as the first embodiment.

Another Embodiment D

Similarly, in the second embodiment described above, the steps S13 and S14 are performed with respect to the material 5 which has not been subjected to the semi-cutting. However, the steps S13 and S14 may also be performed with respect to the material 5 subjected to the semi-cutting (that is, the semi-finish lathe-turning). In this case, for example, in the step S11 described above, the material 5 subjected to the semi-cutting is prepared. Also, in this case, other points are the same as the second embodiment.

The invention claimed is:

1. A method of cutting a thin-walled material having an inner round surface and an outer round surface over a predetermined range in the direction parallel to a central axis thereof, the method comprising the steps of:
   (A) preparing a material having a suitable stock for obtaining the thin-walled material;
   (B) cutting the inner round surface by a desired distance within the predetermined range by feeding a cutting tool relative to the material by the desired distance from one end side to the other end side of the central axis while rotating the material around the central axis;
   (C) cutting the outer round surface by a desired distance within the predetermined range by feeding the cutting tool relative to the material by the desired distance from one end side to the other end side of the central axis while rotating the material around the central axis; and
   (D) finishing the inner round surface and the outer round surface over the predetermined ranges by alternately repeating the steps (B) and (C),
   wherein the step (D) is performed in order of the step (B) and the step (C) or in order of the step (C) and the step (B), after the step (A).

2. The method of cutting a thin-walled material according to claim 1, wherein
   in the step (B), the cutting tool is fed from one end side to the other end side of the central axis up to a position entered in the direction parallel to the central axis by a distance within the desired distance into an uncut region of the outer round surface side, and
   in the step (C), the cutting tool is fed from one end side to the other end side of the central axis up to a position entered in the direction parallel to the central axis by a distance within the desired distance into an uncut region of the inner round surface side.

3. A method of cutting a thin-walled material having at least one of an outer round surface and an inner round surface with respect to a central axis, and also having a flange which extends outward or inward in a radial direction from the outer round surface or the inner round surface, wherein the flange has a first side surface, which faces one side in the direction parallel to the central axis, and a second side surface, which faces the other side in the direction parallel to the central axis, over a predetermined range in the radial direction, the method comprising the steps of:
   (A) preparing a material having a suitable stock for obtaining the flange;
   (B) cutting the first side surface by a desired distance within the predetermined range by feeding a cutting tool relative to the material by the desired distance from the outside in the radial direction to the inside in the radial direction or from the inside in the radial direction to the outside in the radial direction while rotating the material around the central axis;
   (C) cutting the second side surface by a desired distance within the predetermined range by feeding the cutting tool relative to the material by the desired distance from the outside in the radial direction to the inside in the radial direction or from the inside in the radial direction to the outside in the radial direction while rotating the material around the central axis; and
   (D) finishing the first side surface and the second side surface over the predetermined ranges of the flange by alternately repeating the steps (B) and (C),
   wherein the step (D) is performed in order of the step (B) and the step (C) or in order of the step (C) and the step (B), after the step (A).

4. The method of cutting a thin-walled material according to claim 1, wherein
   a cutting edge of the cutting tool has a feed-side surface that faces a feed direction side of the cutting tool, and a material-side surface that faces a cutting surface side of the material, and
   the steps (B) and (C) are performed in a state where a direction of the feed-side surface is set to be a direction slightly inclined from a feed direction of the cutting tool to the cutting surface side.

5. The method of cutting a thin-walled material according to claim 1, wherein
   a cutting edge of the cutting tool has a feed-side surface that faces the feed direction side of the cutting tool, and
   step (B) or step (C) is performed while controlling a direction of the cutting tool so that at a normal-line varying region where a direction of a normal line to the inner round surface or the outer round surface varies according to an axial location, and the angle that the feed-side surface makes with a cutting surface of the material is in the range of 80 degrees or more and 100 degrees or less.

6. The method of cutting a thin-walled material according to claim 3, wherein
   a cutting edge of the cutting tool has a feed-side surface that faces the feed direction side of the cutting tool, and
   step (B) or step (C) is performed while controlling a direction of the cutting tool so that at a normal-line varying region where a direction of a normal line to the first side surface or the second side surface varies according to a radial location, and the angle that the feed-side surface makes with a cutting surface of the material is in the range of 80 degrees or more and 100 degrees or less.

7. The method of cutting a thin-walled material according to claim 3, wherein when the thicknesses of suitable stocks are different from each other at a surface in which lathe turning is performed and at the opposite surface, then lathe turning of a surface of which the thickness of the suitable stock is thin is first performed.

8. The method of cutting a thin-walled material according to claim 2, wherein
   a cutting edge of the cutting tool has a feed-side surface that faces a feed direction side of the cutting tool, and a material-side surface that faces a cutting surface side of the material, and
   the steps (B) and (C) are performed in a state where a direction of the feed-side surface is set to be a direction slightly inclined from the feed direction of the cutting tool to the cutting surface side.

9. The method of cutting a thin-walled material according to claim 3, wherein
   a cutting edge of the cutting tool has a feed-side surface that faces a feed direction side of the cutting tool, and a material-side surface that faces a cutting surface side of the material, and
   the steps (B) and (C) are performed in a state where a direction of the feed-side surface is set to be a direction slightly inclined from a feed direction of the cutting tool to the cutting surface side.

10. The method of cutting a thin-walled material according to claim 2, wherein
    a cutting edge of the cutting tool has a feed-side surface that faces the feed direction side of the cutting tool, and
    step (B) or step (C) is performed while controlling a direction of the cutting tool so that at a normal-line varying region where a direction of a normal line to the inner round surface or the outer round surface varies according to an axial location, and the angle that the feed-side surface makes with a cutting surface of the material is in the range of 80 degrees or more and 100 degrees or less.

11. The method of cutting a thin-walled material according to claim 1, wherein when the thicknesses of suitable stocks are different from each other at a surface in which lathe turning is performed and at the opposite surface, then lathe turning of a surface of which the thickness of the suitable stock is thin is first performed.

* * * * *